United States Patent [19]
Kirschenmann et al.

[11] Patent Number: 5,630,622
[45] Date of Patent: May 20, 1997

[54] STRUCTURAL WELD JOINT WITH INTERNAL GUSSET

[75] Inventors: Kolin J. Kirschenmann, Decatur; Robert L. McNabb, Monticello; Gail F. Westendorf, Decatur, all of Ill.

[73] Assignee: Caterpillar Inc., Peoria, Ill.

[21] Appl. No.: 354,345

[22] Filed: Dec. 12, 1994

[51] Int. Cl.$^6$ .................................. B60R 21/13
[52] U.S. Cl. ............ 280/756; 180/89.12; 248/903; 280/784
[58] Field of Search .................. 280/756, 784; 180/89.12, 89.13, 89.19; 296/102, 189, 190, 205; 403/270, 271, 272, 265; 285/382, 286; 248/903 C; 29/897.2; 228/154, 173.4

[56] References Cited

U.S. PATENT DOCUMENTS

| | | | |
|---|---|---|---|
| 2,566,769 | 9/1951 | Kay | 285/382 |
| 3,970,401 | 7/1976 | Lubeck | 403/265 |
| 5,280,955 | 1/1994 | Nelson et al. | 280/756 |
| 5,441,241 | 8/1995 | McKim | 403/265 |

FOREIGN PATENT DOCUMENTS

| | | | |
|---|---|---|---|
| 1011372 | 5/1977 | Canada | 296/102 |
| 1632836 | 3/1991 | U.S.S.R. | 280/756 |

*Primary Examiner*—Eric D. Culbreth
*Attorney, Agent, or Firm*—Loyal O. Watts; William C. Perry

[57] ABSTRACT

This invention utilizes a cast corner member (20) as a support base for the load bearing members (14) of a roll over protection structure (10). The cast corner member (20) has an end portion (34) comprising at least one gusset (40) which telescopically engages a tubular member (14). The gusset (40) has a tapered configuration which defines a free end portion (36) that has a reduced cross-sectional area and is positioned within the tubular member (14) in slightly spaced relationship to at least one of the side walls of the tubular member (14). When the end portion (34) of the corner member (20) is telescopically received within the tubular member (14), a groove is formed to receive a weld bead (22) which secures the two members together. Since the area of the weld bead (22) is inherently the weakest portion of the structure, the gusset (40) functions to direct bending stresses to an area away from the weld bead (22) to prevent the weld from cracking when the roll over protection structure (10) encounters a bending load.

14 Claims, 4 Drawing Sheets

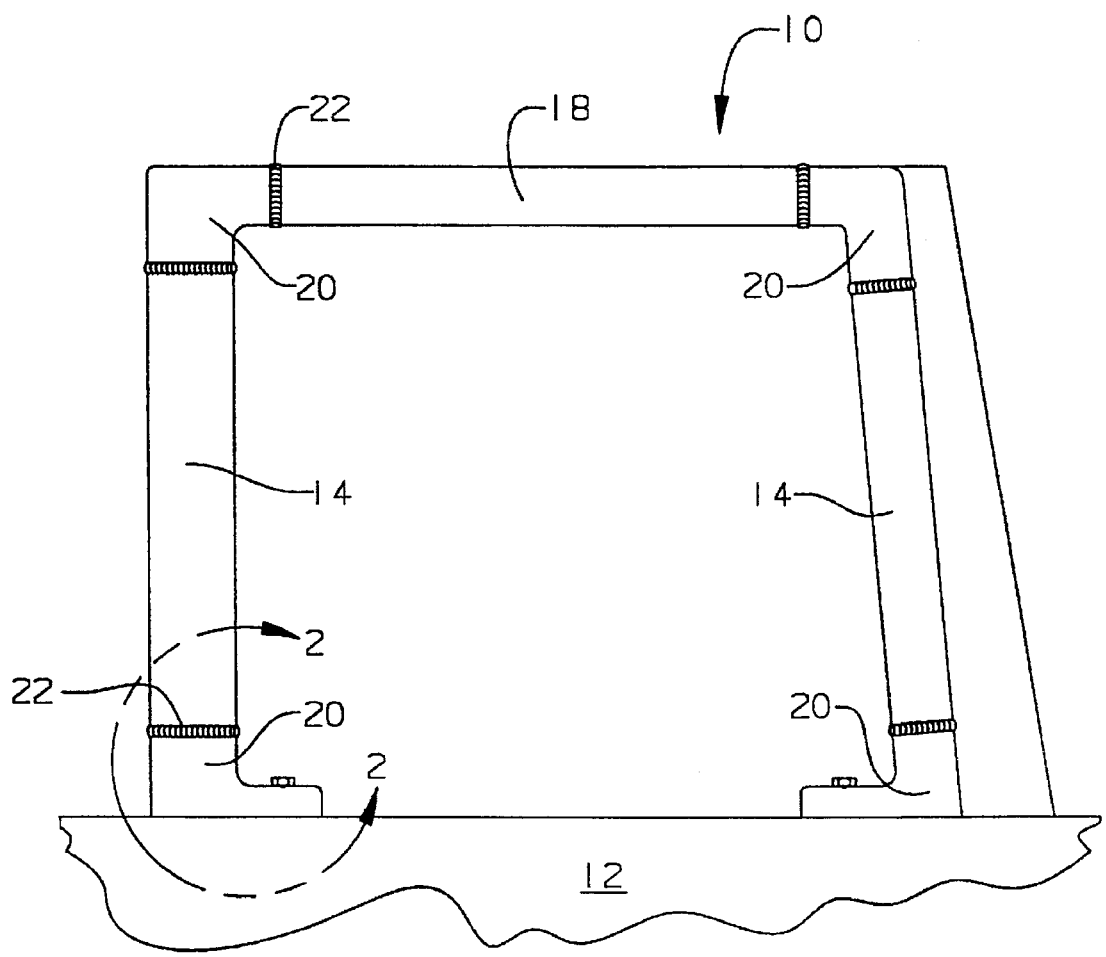

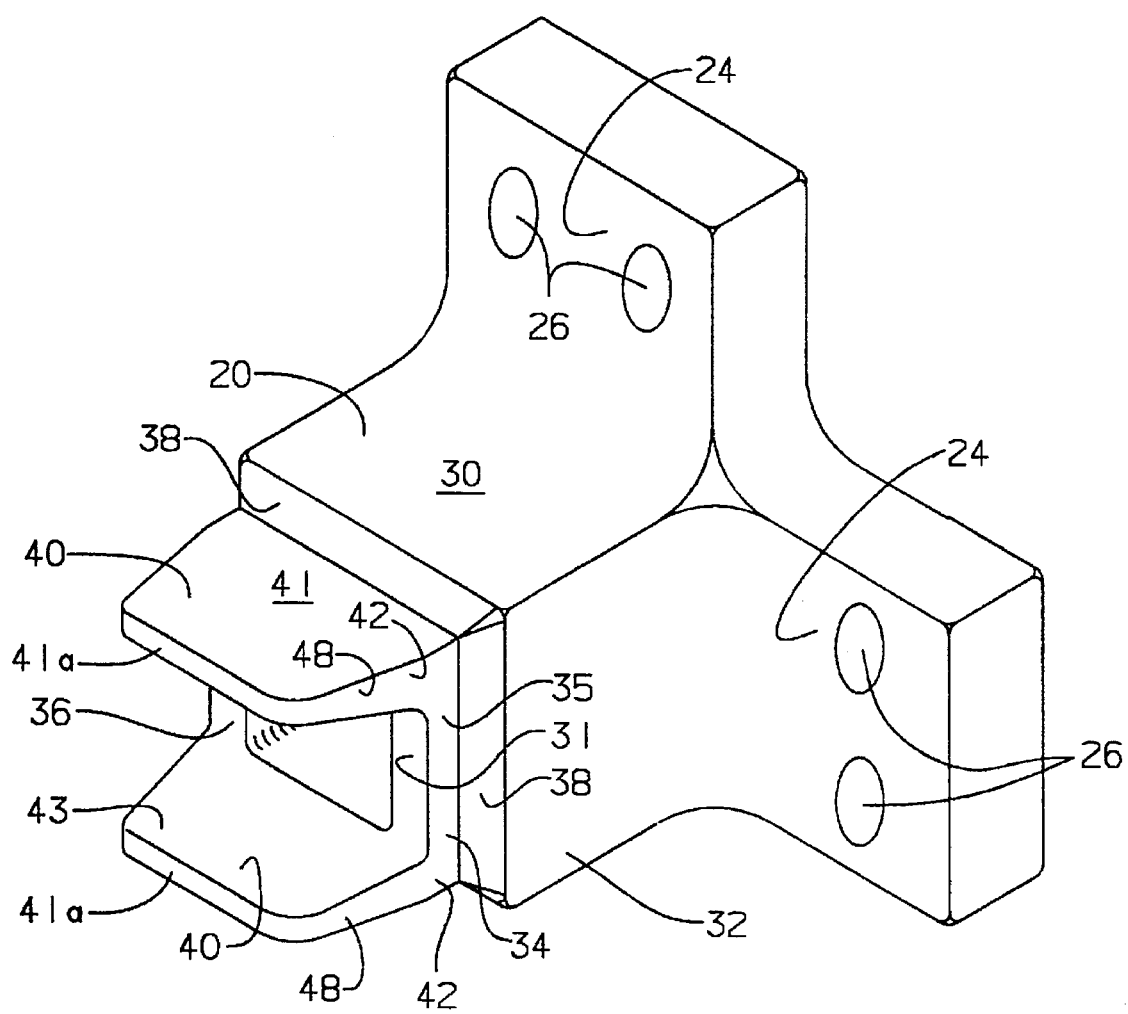

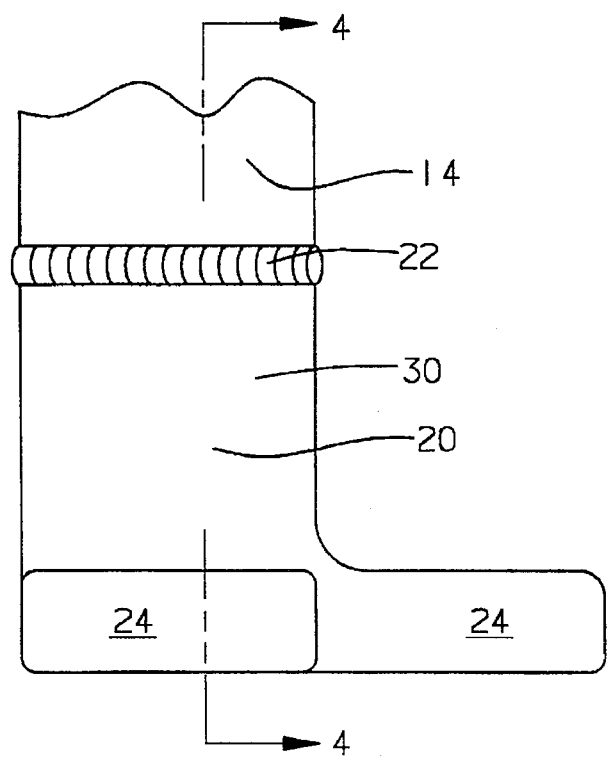
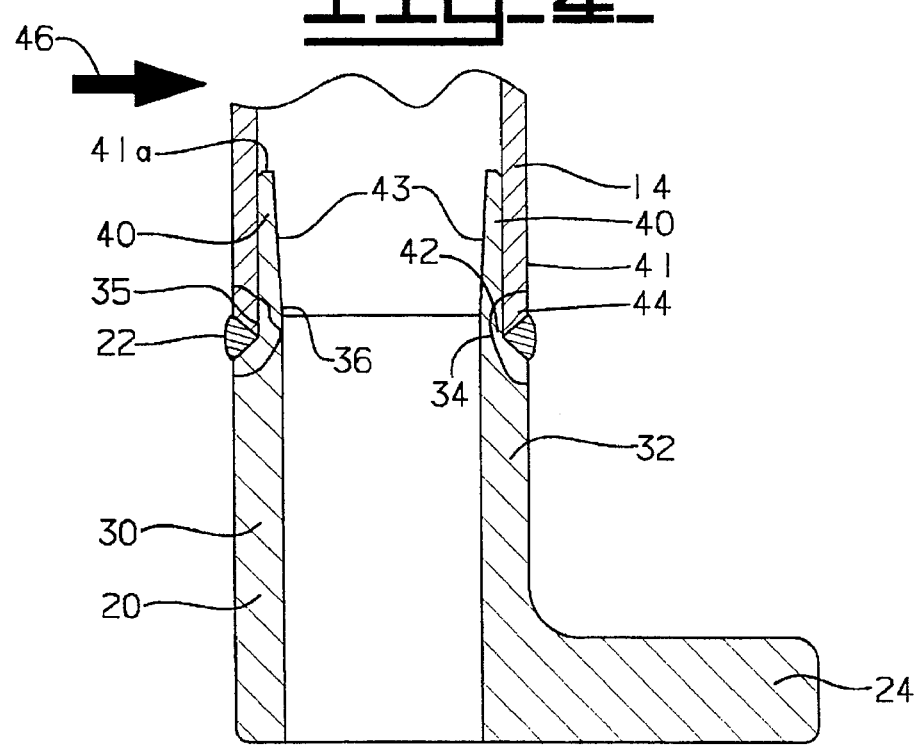

STRUCTURAL WELD JOINT WITH INTERNAL GUSSET

TECHNICAL FIELD

The present invention relates generally to welded tubular structural connections and more particularly to a structural weld joint with internal gussets to minimize strain in the structural members in and/or adjacent the zone where the material microstructure is affected by the heat from the weld process.

BACKGROUND ART

It is common practice in the manufacture of metal structures, for example, roll-over protective structures (ROPS) for earthmoving vehicles, to utilize welding for connection of various elements of the structure. It is also known that such structures may include one or more tubular members such that access to the interior of the welded structure is severely restricted or not possible. Welding of metals involves large amounts of heat which propagates to metal immediately adjacent the welded joint. Such heat may introduce deleterious changes in the microstructure of the metal thus affecting the overall strength and durability of the welded joint.

While fully fabricated ROPS structures are known it is necessary to join the members by welding in the corner areas. As a result numerous external gussets and corner brackets are required to provide suitable strength in the corners to withstand the forces to which the structure may be subjected. This results in a very labor intensive process to fabricate the structure with attendant high cost, both in materials and labor.

It is also known to utilize cast corner members to reduce the number of parts and the amount of welding required in manufacture of large structures such as a ROPS. Such cast corners normally include a short pilot portion disposed within the connecting tubular members to initially align the members and provide back-up for the weld process. The inner ends of the pilot portions create, with the tubular member, an abrupt change in section of the material in the heat affected zone of the material near the weld.

As large external loads are applied to the structure any deflection or bending of the tubular members tends to occur at the abrupt change in section (stress concentration) at the end of the pilot portion. Severe bending in this area may result in cracks or premature failure through the heat affected zone due to the altered microstructure therein.

U.S. Pat No. 5,280,955 issued to Peter M. Nelson on Jan. 25, 1994 and is commonly assigned to the assignee of the instant application. This patent discloses a ROPS with cast corner members having relieved portions 48 and 50 that define reduced cross-sectional areas. The reduced cross-sectional areas provide very predictable deformation and, therefore deformation of the overall structure may also be predictable. This patent also discloses in FIG. 2 a generally rectangular projection 52 which serves to pilot the two components and to provide backup for the weld between the two components similar to that described above.

It is desirable that a structure for a weld joint be provided to achieve a more gradual change in section in the area of the heat affected zone adjacent the weld to reduce strain therein due to bending under heavy load.

The present invention is directed to overcoming one or more of the problems as set forth above.

DISCLOSURE OF THE INVENTION

In one aspect of the invention a structural weld joint includes a cast member having a first portion with an outer surface of a predetermined external size and shape. A second portion projects from one end of the first portion and has a free end and an external surface of a predetermined size and shape which is smaller than the predetermined size and shape of the first portion. At least one gusset having a free end and an outer surface is secured to and extends from the free end of the second portion of the cast member. A transition portion extends between the first and second portions of the cast member. A tubular member having an inner surface of a predetermined internal size and shape is disposed in telescopic relationship with the gusset and the second portion of the cast member. A portion of the inner surface of the tubular member is disposed in close proximity to the outer surface of the at least one gusset for load bearing contact therewith due to deflection under load.

The instant structural weld joint provides support for the tubular member in the area adjacent the free end of the second portion of the cast member should bending occur due to externally applied loads. As a result the change in section at the juncture of the second portion of the cast member and the tubular member is minimized and is moved to an area outside of the heat affected zone. As external loads are applied bending in the heat affected zone is reduced by spreading strain in the tubular member over a larger area thus causing some of the bending to occur in the parent material.

BRIEF DESCRIPTION OF THE DRAWINGS

FIG. 1 is an elevational side view of a rollover protective structure for a machine and including an embodiment of the present invention.

FIG. 2 is a perspective view of one component of the invention taken within the encircling line 2 of FIG. 1.

FIG. 3 is an elevational view of the structural weld joint of the present invention also taken within the encircling line 2 of FIG. 1.

FIG. 4 is a cross-sectional view taken along line 4—4 of FIG. 3 and showing the structural weld joint of the present invention.

BEST MODE FOR CARRYING OUT THE INVENTION

Figure 5:
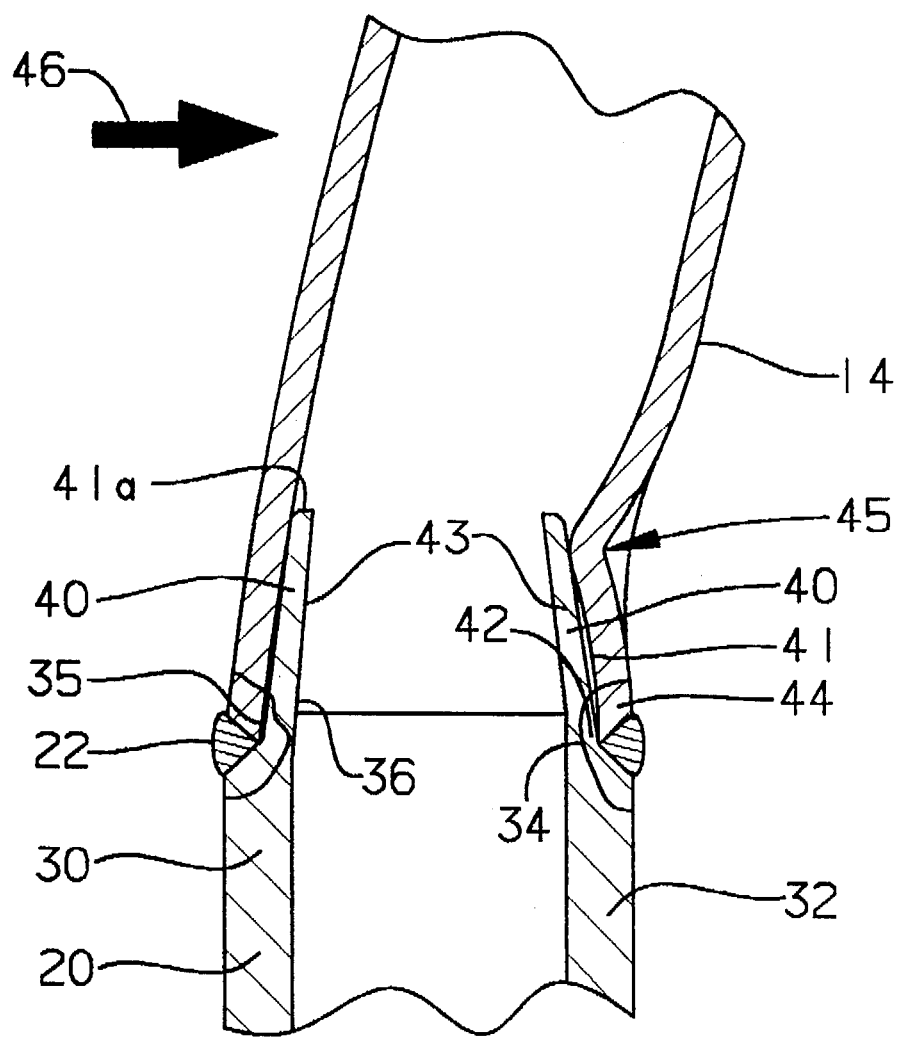
FIG. 5 is a cross-sectional view similar to FIG. 4 disclosing the controlled deformation in the weld joint area due to application of an external load.

Referring now to the drawings, and particularly FIG. 1, a rollover protective structure (hereinafter referred to as ROPS) shown generally at 10 is mounted to a machine (such as construction machinery) frame, a portion of which is shown at 12. The ROPS structure is generally constructed as an open framework including generally vertically disposed tubular frame members 14, generally horizontally arranged tubular frame members 18 and a plurality of cast corner members 20. The cast members 20 are utilized to interconnect the generally vertically and horizontally disposed tubular members 14 and 18 respectively to provide a structural protective framework for an operator's station on the machine.

The cast corner members 20 are secured to appropriate vertical and horizontal ones of the tubular frame members by welding, such as illustrated at 22.

FIGS. 2, 3 and 4 illustrate the cast corner member at the lower left corner of FIG. 1 and encircled by line 2—2. FIG.

2 illustrates the cast corner member in perspective as having a pair of mounting feet 24 each having a pair of holes 26 therein and an upwardly projecting tubular mounting leg 30 defining walls 31 of a predetermined thickness. The leg 30 includes a first portion 32 having a predetermined size and shape and a second or end portion 34 having a free end 36 and an axterior surface 35 of a predetermined size and shape which is smaller than the size and shape of the first portion 32. In this particular embodiment the first and second portions are generally rectangular (including square) in shape although it is recognized that they may be of any other suitable shape such as round, elliptical, etc. For purposes of reference the direction along the length of the tubular members 14 is considered to be longitudinal and perpendicular thereof to be transverse.

A transition portion 38 extends between the first and second portions 32–34 and in this particular embodiment extends in an angularly inwardly (radially) direction from the first portion 32 toward the second portion 34.

At least one, and in this particular embodiment a pair of ears or gussets 40 individually having an outer surface 41 and a free end 41a are integrally secured, in laterally spaced relation, to opposite edges 42 of the free end 36 of the second portion 34 of the cast member 20, i.e., two of the walls 31. The gussets 40 each have a predetermined thickness at the point of connection with the free end 36 of the second portion 34 which is substantially equal to the thickness of the walls 31.

An inner surface 43 of each the gussets 40 is angled outwardly toward the free end 41a such that the gusset becomes progressively, laterally thinner toward its free end 41a. As a result the thickness at the free end 41a is substantially less than the predetermined thickness of the corresponding wall 31 of the second portion 34 to which it is secured. The gusset 40 is cantilevered from the free end 36 of the second portion 34 and is therefore unsupported along its longitudinal length. The lack of longitudinal support and the progressively reduced thickness of the gusset presents a substantially reduced cross-sectional effect to the interior surface of the tubular member as compared to the closed section of the second portion 34. The subject structure provides a gradual change in bending stiffness at the weld joint region. As a result high stress/strain at the weld joint and/or at the free end 36 of the second portion 34 of the casting 20 is substantially eliminated.

The gussets 40 extend from the free end of the second portion 34 longitudinally along the tubular member with the outer surface 41 thereof disposed in slightly spaced relation to the internal surface of the tubular member 14. Although the spacing relationship may vary with size or application the preferred maximum spacing in this embodiment is 3.5 millimeters (mm) and preferably is within a range of 0.0–2.5 mm.

As may be best seen in FIG. 2 the gussets individually include opposite edges 48 which are tapered (convergent) from the free end 36 of the second portion toward the free end 41a of the gussets, i.e., longitudinally of the tubular member. Such tapering further reduces the cross-sectional area presented to the tubular member 14 at the free end of the gusset. This tapering of the edges of the gussets also delays engagement thereof with the adjacent side of the tubular member should bending occur in that plane. This minimizes localized deformation of the tubular member at the point of contact of the narrow edges 48 therewith.

FIG. 3 illustrates the structure in elevation to show the finished relationship of components of the structural weld joint. The cross-section of FIG. 4 illustrates the details of the fit relationship of the parts. The weld 22 is shown as connecting the cast corner member 20 with the tubular member 14 and with a representation of the heat affected zone illustrated at 44. FIG. 5 illustrates the controlled, energy absorbing deformation of the tubular member 14 and the adjacent gusset 40, particularly in the area indicated generally by the reference numeral 45, as may occur when a large external load is applied in the direction indicated by an arrow 46. It is apparent that the major deformation occurred in an area remote from the weld joint and the heat affected zone. Support by the gusset 40 controlled the deformation in the area 45 and prevented it from propagating to the weld area. The bending along the side of the tube to which the load is applied is spread over a substantial length of the tube thus limiting the stress/strain in the area of the weld and the heat affected material.

If the load represented by the arrow 46 is reversed the deformation or bending will be opposite that illustrated and the gussets 40 will react in the opposite direction to provide support for the tubular member 14. If the structure is subjected to bending in all four directions two additional gussets may be provided on the other two edges of the free end 36 of the second portion 34. In that instance, however, it is important that the additional gussets be cantilevered and shaped to not provide any support to adjacent gussets either before or after bending. In other words it is preferred that the gussets be shaped so that they act independently.

Although not illustrated, it can easily be recognized that the tubular member 14 may bend rather sharply in the heat affected zone adjacent the free end 36 of the second portion 34 in the absence of the gusset 40. Although a single structural weld joint has been described it is to be understood that the weld joint of the present invention is used in each of the connections between the vertical tubular members 14 and the cast corner members 20.

Industrial Applicability

The rollover protective structure 10 mounts on construction machinery in a protective relationship to the operator's station. In the unlikely event the machine should roll over the ROPS is designed to support the weight of the machine without total collapse. It is recognized that some bending will occur as energy is absorbed and it is preferred that such bending be controlled as to its location and magnitude.

With the structure of the present invention the necessary weld connections or joints are designed in such a way to limit bending in the heat affected zones to avoid cracking of the material in that area and possible subsequent failure. For example, when a large load is imposed on the structure as indicated by arrow 46 bending is controlled as depicted in FIG. 5. At the beginning of or after a small amount of deflection the inner surface of the tubular member contacts the outer surfaces 41 of the gussets 40. The major deflection or deformation of the tubular member is confined to the area 45 of the parent material longitudinally spaced from the weld and adjacent heat affected zone. This action not only moves the deflection or bending away from the weaker heat affected zone but also spreads the bending over a greater distance to reduce the severity of the bend at any given point.

Other aspects, objects and advantages of this invention can be obtained from a study of the drawings, the disclosure and the appended claims.

We claim:

1. A structural weld joint, comprising:

a cast member including a first portion having an outer surface of a predetermined external size and shape, a second portion projecting from one end of the first portion and having a free end and an external surface of a predetermined size and shape which is smaller than the predetermined size and shape of the first portion, a transition portion extending between the first and second portions of the cast member, at least one gusset having a free end and an outer surface and being secured to and extending from the free end of the second portion of the cast member; and a tubular member having an inner surface of a predetermined internal size and shape and being disposed in telescopic relationship with the at least one gusset and the second portion of the cast member and a portion of the tubular member inner surface is disposed in close proximity to the outer surface of the at least one gusset for load bearing contact therewith due to deflection under load.

2. The structural weld joint as set forth in claim 1, wherein the at least one gusset has an inner surface which is angled longitudinally in a manner to decrease the cross-sectional area of the at least one gusset progressively toward the free end thereof.

3. The structural weld joint as set forth in claim 2, wherein the at least one gusset comprises a pair of gussets disposed in transversely spaced relationship on opposite sides of the free end of the second portion of the cast member.

4. The structural weld joint as set forth in claim 3, wherein the outer surface of the at least one gusset is spaced from the interior surface of the tubular member within the range of 0.1 3.5 millimeters.

5. The structural weld joint as set forth in claim 4, wherein the second portion of the cast member and the tubular member are generally rectangular in cross-section.

6. The structural weld joint of claim 5, wherein the second portion of the cast member is tubular with the walls having a predetermined thickness which is substantially the same as the predetermined thickness of the end of the gusset secured thereto.

7. The structural weld joint as set forth in claim 2, wherein the gusset is cantilevered from the free end of the second portion of the cast member.

8. A rollover protective structure adapted for mounting on a machine in protective relationship to an operator's station thereon, comprising:

a plurality of substantially vertically disposed tubular frame members having an interior surface of a predetermined size and shape, a plurality of substantially horizontally disposed tubular frame members, a plurality of cast corner members each having a tubular end portion including a free end and an external surface of a predetermined size and shape individually telescopically disposed within a respective end of a corresponding one of the substantially vertically disposed tubular frame members, the tubular end portion having walls of a predetermined thickness and at least one gusset secured in cantilevered relation to the free end of the end portion to extend longitudinally therefrom and having an outer surface disposed in close proximity to the interior surface of the tubular frame.

9. The rollover protective structure as shown in claim 8, wherein the at least one gusset includes a free end and is longitudinally tapered in a manner to progressively decrease the cross-sectional area toward the free end thereof.

10. The rollover protective structure of claim 9, wherein the outer surface of the at least one gusset is spaced from the inner surface of the tubular member within a range of 0.0 to 3.5 millimeters.

11. The rollover protective structure of claim 10, wherein the end portion of the cast corner member and the telescoped portion of the tubular member are generally rectangular in cross-section.

12. The rollover protective structure of claim 11, wherein the predetermined thickness of the secured end of the at least one gusset is substantially the same as the predetermined thickness of the wall of the end portion of the cast corner member to which it is secured and the thickness of the free end of the at least one gusset is less than the predetermined thickness of the secured end thereof.

13. The rollover protective structure of claim 12, wherein the at least one gusset includes a pair of gussets disposed in transversely spaced relationship on opposite sides of the free end of the end portion.

14. The rollover protective structure of claim 13, wherein the lateral edges of each gusset is disposed in a converging relation from the secured end toward the free end of the gusset.

* * * * *

UNITED STATES PATENT AND TRADEMARK OFFICE
CERTIFICATE OF CORRECTION

PATENT NO. : 5,630,622

DATED : May 20, 1997

INVENTOR(S) : Kolin J. Kirschenmann, et al.

It is certified that error appears in the above-identified patent and that said Letters Patent is hereby corrected as shown below:

Column 6, line 22, delete "0.0" and insert --0.1--

Signed and Sealed this

Twenty-ninth Day of December, 1998

*Attest:*

BRUCE LEHMAN

*Attesting Officer*     *Commissioner of Patents and Trademarks*